United States Patent [19]

Nishiyama et al.

[11] Patent Number: 4,889,093
[45] Date of Patent: Dec. 26, 1989

[54] THROTTLE OPENING CONTROLLER

[75] Inventors: Yukinori Nishiyama; Hideaki Fujioka, both of Itami; Hisaaki Yamaguchi, Hiroshima; Toshiki Ikeda, Hiroshima; Keisuke Miyoshi, Hiroshima, all of Japan

[73] Assignees: Sumitomo Electric Industries, Ltd.; Mazada Motor Corporation, both of Japan

[21] Appl. No.: 267,478

[22] Filed: Nov. 4, 1988

[30] Foreign Application Priority Data

Nov. 6, 1987 [JP]  Japan .................................. 62-281355

[51] Int. Cl.⁴ ......................... F02D 37/00; F02P 5/02
[52] U.S. Cl. ..................................... 123/400; 123/413
[58] Field of Search ............... 123/400, 413, 399, 361, 123/339

[56] References Cited

U.S. PATENT DOCUMENTS 4,566,415  1/1986  Iwai et al. ............................. 123/361
4,787,353  11/1988  Ishikawa et al. ...................... 123/400
4,796,579  1/1989  Wolfe et al. .......................... 123/400

Primary Examiner—Raymond A. Nelli
Attorney, Agent, or Firm—Wenderoth, Lind & Ponack

[57] ABSTRACT

A throttle opening controller provided between an accelerator pedal and an engine throttle of an automobile. It has an output shaft driven by a motor, a motor lever fixedly mounted on the output shaft and ring members including an accelerator ring, a motor ring and a throttle ring all rotatably mounted on the output shaft. The accelerator ring is connected to the accelerator pedal and the throttle ring is connected to the throttle through wires. The motor lever is controlled by a traction control device. When the traction control is not activated, the motor lever is kept in its FULL-OPEN position, allowing the movement of the accelerator pedal to be transmitted as it is to the throttle through the accelerator ring, the motor ring coupled to the accelerator ring through a spring, and the throttle ring adapted to turn in the throttle-opening direction by and with the motor ring.

4 Claims, 5 Drawing Sheets

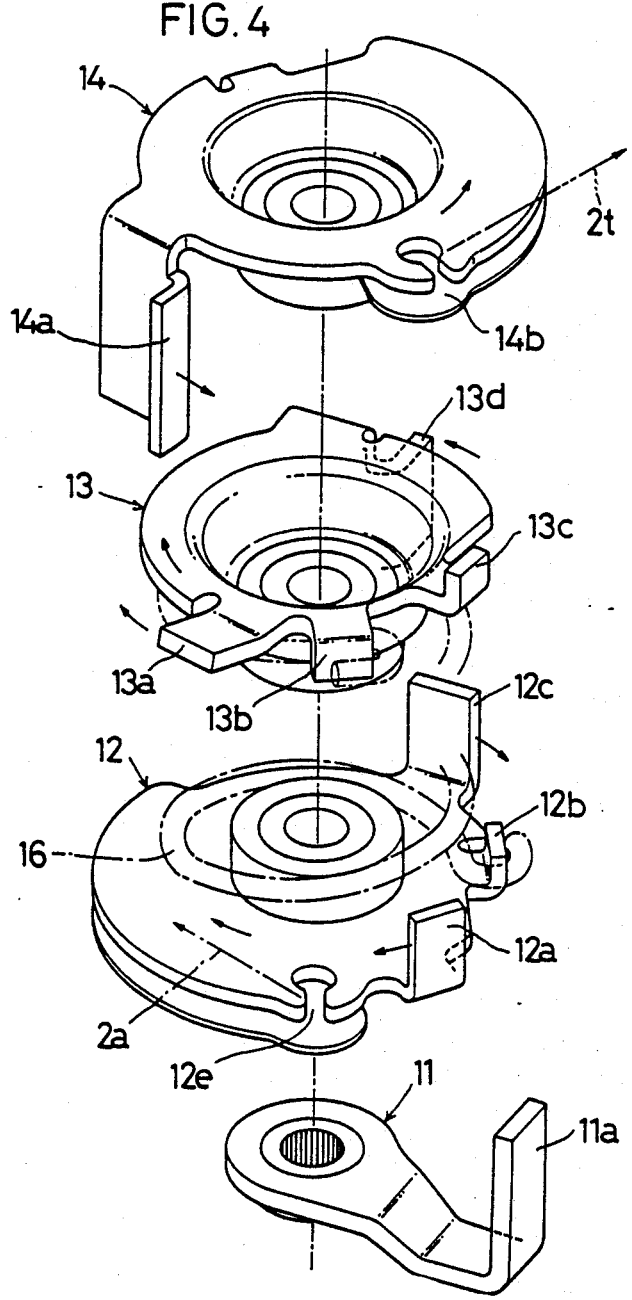

THROTTLE OPENING CONTROLLER

The present invention relates to a throttle opening controller provided in the wiring between the accelerator pedal and the throttle for an automobile engine to adjust the opening of the throttle during traction control.

Today's motor vehicles are equipped with various electronic control systems such as a traction control system, an antilock brake system and a four-wheel steering system. Such systems will help a driver to control his car more stably and more safely.

Among them, the traction control system serves to ensure the running stability and the drivability when starting the car and during running. It also serves to improve the vehicle acceleration If the driver treads down the accelerator pedal excessively, thus imparting an excessive driving force to the wheels, an electronic control system in the traction control system will detect such an excessive driving force, calculate the acceleration of the wheels and the estimated vehicle speed and acceleration on the basis of the information supplied from wheel speed sensors, and activate the traction control to reduce the driving force on the driving wheels. This prevents the vehicle from losing stability or getting out of control.

There are two ways to restrain the driving force on the driving wheels even if the accelerator pedal is trodden. One is to reduce the engine output. The other is to brake the wheels irrespective of the driver's operation. As one of the former method, it is known to provide a throttle opening controller in the wiring between the accelerator pedal and the engine throttle to control the opening of the throttle.

A traction control system using such a method is disclosed in Japanese Unexamined Patent Publication No. 59-79050. The system disclosed in this publication comprises two pulleys to guide a wire provided between the throttle and the accelerator pedal. One of the pulleys is adapted to adjust the wire length through a gear assembly in response to the command from an electronic control unit and thus to adjust the opening of the throttle.

With such a traction control system, provision has to be made against the mechanical or electrical failure of the system. Namely, it is required that the driver can at least keep control of the car at his will and drive the car normally even in case of mechanical or electrical failure of the system. As a failsafe measure, a throttle opening controller in the traction control system may be adapted to cease functioning if the system fails so that the throttle can be solely controlled by the pedal work as if no throttle opening controller were mounted.

But with the prior art systems, such a failsafe measure was not taken into consideration. As one failsafe measure, a clutch might be provided between the driving unit and the pulleys for adjusting the length of the connecting wire to disconnect them from each other in case of the failure of the system. But if the clutch itself should break down, the connecting wire will get immovable, making it impossible to open the throttle.

With such a prior art traction control system, it becomes impossible to open and close the throttle if the system suffers a mechanical or electrical breakdown. Thus, it is not sufficiently reliable If the system should break down while the car is running, it might be brought to an abrupt stop because the throttle is forced shut.

It is an object of the present invention to provide a throttle opening controller which obviates the abovesaid shortcomings and which allows the vehicle to at least keep moving or start moving even if its driving unit should break down either mechanically or electrically.

According to the present invention, the ring members comprising the accelerator ring, motor ring and throttle ring are coupled together through the elastic member and rotated in unison in normal conditions. During the traction control mode, the motor lever is turned to a predetermined angular position from its original inoperative position to restrict the angle of rotation of the motor ring. Even if the motor lever is turned beyond the predetermined angular position, the throttle can be opened at least to the position corresponding to this predetermined angular position if the accelerator pedal is trodden to the FULL-OPEN position. Thus, even if the throttle opening controller malfunctions, the throttle can be opened barely enough to start the vehicle This will improve the reliability of the traction control system.

Other features and objects of the present invention will become apparent from the following description taken with reference to the accompanying drawings, in which:

FIG. 4 is an exploded view of the same;

FIGS. 6a to 6e are other explanatory views corresponding to FIGS. 5a to 5e;

Figure 1:
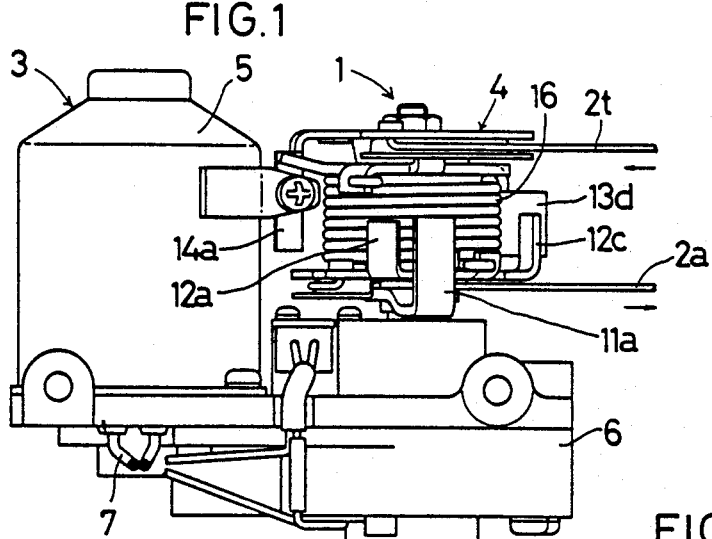
FIG. 1 is a side view of the throttle opening controller embodying the present invention.

FIG. 1 shows a throttle opening controller 1 embodying the present invention which is provided between the accelerator pedal and the engine throttle of an automobile and coupled to them by means of accelerator wires 2a and 2t.

The throttle opening controller 1 comprises a driving unit 3 and a rotary unit 4. The rotary unit is driven by a motor 5 in the driving unit 3 through a reduction unit 6. The motor 5 is connected to a power source 7. The reduction unit 6 has an output shaft 8 (FIG. 2) on which the rotary unit 4 is rotatably mounted. A nut 9 is threadedly mounted on the shaft 8 to keep the rotary unit 4 from coming off the shaft.

Figure 3:
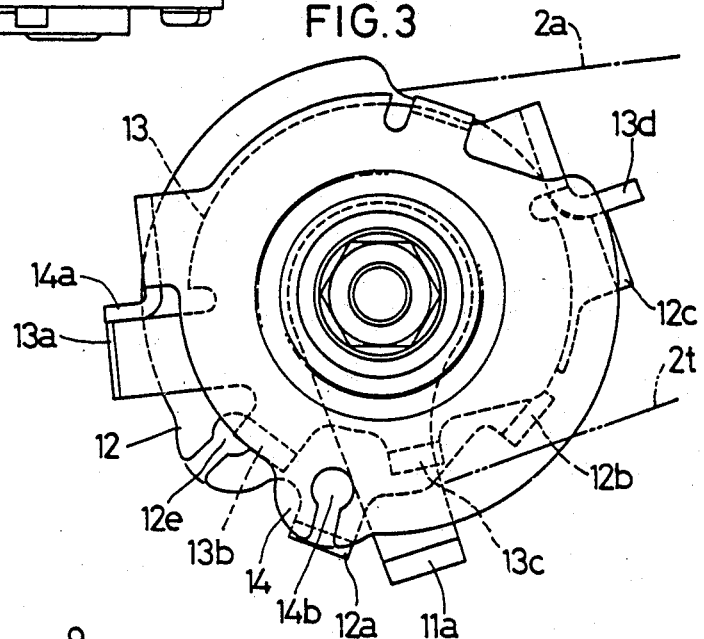
FIG. 3 is a plan view of the same.
Figure 2:
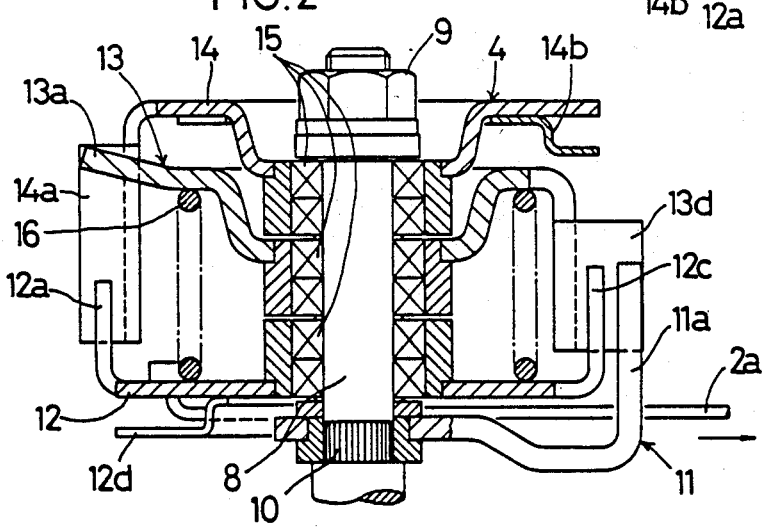
FIG. 2 is a sectional view of the rotary unit of the same.

As shown in FIGS. 2 to 4, the rotary unit 4 comprises a motor lever 11 fixedly mounted on the output shaft 8 through a spline 10, and three ring members i.e. an accelerator ring 12, a motor ring 13 and a throttle ring 14 which are arranged above the motor lever 11 in this order (FIG. 4) and rotatably mounted on the output shaft 8 one above another through respective bearings 15. An elastic member 16 (a coil spring in the preferred embodiment) is provided between the accelerator ring 12 and the motor ring 13 with one end thereof engaging the ring 12 and the other end thereof engaging the ring 13.

The motor lever 11 has an L-shaped section with an upright portion 11a. Its base portion is in engagement with the spline 10. The accelerator ring 12 has claws 12a, 12b and 12c. The claw 12b is in engagement with the elastic member 16. On the back side of the ring 12, there is provided a guide 12d adapted to engage the accelerator wire 2a. Numeral 12e designates a mounting hole for the accelerator wire 2a. Thus, when the accelerator pedal is trodden, the accelerator ring 12 is turned through the accelerator wire 2a.

The motor ring 13 is formed in its center with a recess and is provided with claws 13a, 13b, 13c and 13d. The elastic member 16 has its other end in engagement with the claw 13b. As shown in FIG. 2, the claw 13d is disposed in such a position that when the accelerator ring 12 and the motor lever 11 will turn, their respective claws 12c and 11a will butt the claw 13d.

The throttle ring 14 is also formed with a recess in its center and has a claw 14a at its outer periphery. The claw 14a is adapted to abut the claw 13a of the motor ring 13 in some condition and to abut the claw 12a of the accelerator ring 12 in other condition. Numeral 14b designates a mounting hole for the accelerator wire 2t.

The elastic member 16 is adapted to bias in such a direction that the claw 12c of the accelerator ring 12 will abut the claw 13d of the motor ring 13 against each other. The throttle ring 14 is drawn through the accelerator wire 2t in the direction of arrow of FIG. 4 by a return spring of the throttle, keeping its claw 14a in abutment against the claw 13a with a force equivalent to the bias of the return spring (FIG. 3). The claw 12a and the claw 14a are kept out of contact with each other in normal conditions except when the claw 13d of the motor ring 13 is restrained by the motor lever 11. They will get into contact with each other when the accelerator ring 12 turns by a predetermined angle in such a direction as to open the throttle until the motor lever 11 butts and restrains the claw 13d of the motor ring 13. When the accelerator ring 12 is further rotated in the abovesaid direction, the throttle ring 14 will be rotated together with the accelerator ring 12.

Next, the operation of the preferred embodiment will be described.

FIGS. 5a to 5e show the angular positions of the claws of three ring members in different conditions of the rotary unit 4.

Figure 5A:
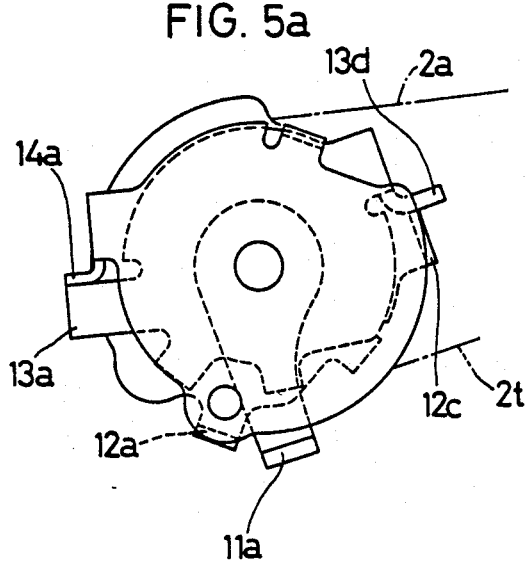
FIGS. 5a to 5e are explanatory views showing how it works.

In FIG. 5a, the rotary unit 4 is in its inoperative position with three ring members in their respective initial positions indicated by 0. FULL-OPEN, 20°-OPEN and FULL-CLOSE in the drawings indicate the positions of the throttle as expressed in terms of the position of the rotary unit 4. The ring members are at the following angle.

motor lever 11 . . . 0°
accelerator ring 12 . . . 0°
motor ring 13 . . . 0°
throttle ring 14 . . . 0°

Figure 5B:
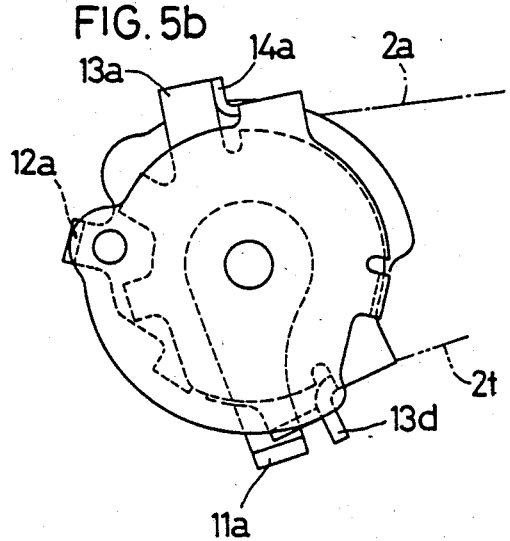

FIG. 5b shows the position of the rotary unit when the accelerator pedal is pushed into the FULL-OPEN position with the traction control system not activated and thus the motor lever 11 in its initial position. Since the system is not in the traction control mode in this state, all the parts in the rotary unit 4 will turn in unison from the FULL-CLOSE position to the FULL-OPEN position (the angle of turn is set at 84 degrees in the preferred embodiment) to fully open the throttle, when the accelerator pedal is trodden to its limit. The parts will be at the following angles.

motor lever 11 . . . 0°
accelerator ring 12 . . . 84°
motor ring 13 . . . 84°
throttle ring 14 . . . 84°

Figure 5C:
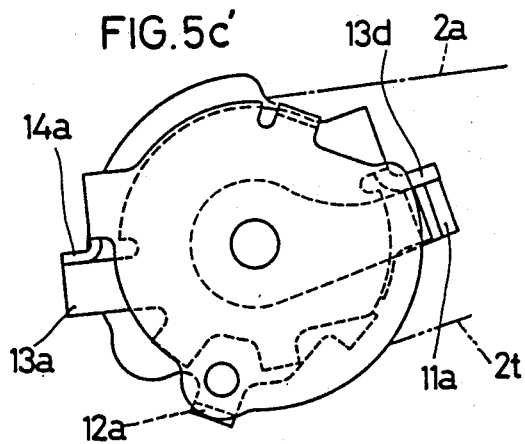
Figure 5C:
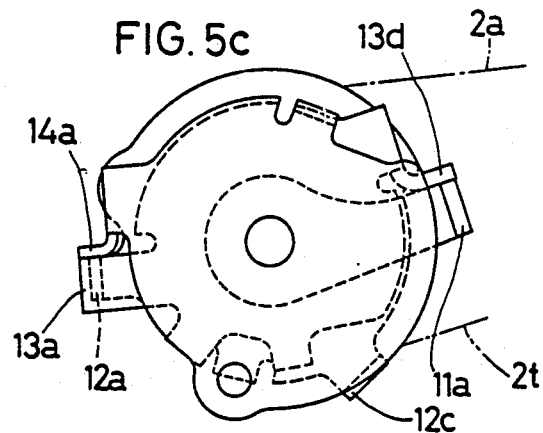

FIG. 5c' shows the position of the rotary unit when the traction control is started. The traction control device has an electronic control unit (not shown) which calculates the wheel speed, wheel acceleration, estimates the vehicle speed on the basis of the pulse signals from the wheel speed sensors, and judges the spinning state of the wheels to apply, if necessary, a signal for traction control to the driving unit 3. If the traction control signal is applied to the driving unit 3, the motor lever 1 will be turned. The larger the amplitude of the signal, the larger the angle by which the motor lever turns. Let us assume that the traction control signal commands the motor lever 11 to turn to its maximum limit (92 degrees in the preferred embodiment, i.e. a play of 8 degrees is left with respect to the throttle FULL-OPEN angle of 84°). If the accelerator pedal is not trodden, the rotary unit 4 will be in the position shown in FIG. 5c' in which the motor lever 11 has its portion 11a in abutment with the claw 13d of the motor ring 13. The parts will be at the following angles.

motor lever 11 . . . 92°
accelerator ring 12 . . . 0°
motor ring 13 . . . 0°
throttle ring 14 . . . 0°

If during such a traction control mode the accelerator pedal is trodden so that the accelerator ring 12 will be turned by 64°, i.e. 20° short of the throttle FULL-OPEN position, the claw 12a of the accelerator ring 12 will get into engagement with the claw 14a of the throttle ring 14, whereas the lever 11a of the motor lever 11 is kept in abutment with claw 13d of the motor ring 13. This state is shown in FIG. 5c in which the throttle ring 14 has its claw 14a still in its initial point, keeping the throttle fully closed.

When the accelerator ring 12 is turned through the accelerator wire 2a, it will pull the motor ring 13 through the elastic member 16. But since the motor ring 13 is restrained by the motor lever 11, the elastic member 16 stretches to allow the accelerator ring 12 to turn by 64° from its original position to such a position that its claw 12a will abut the claw 14a of the throttle ring 14. In other words, the claw 14a and claw 12a are angularly spaced apart from each other by 64° when they are in their initial inoperative positions. With this arrangement, as will be described later in detail, the vehicle will be allowed to at least start moving even if the throttle opening controller malfunctions. The relative angular position between the claw 12a and claw 14a may be adjusted suitably. The parts will be at the following angles in the state of FIG. 5c.

motor lever 11 . . . . 92°
accelerator ring 12 . . . 64°
motor ring 13 . . . 0°
throttle ring 14 . . . 0°

Figure 5D:
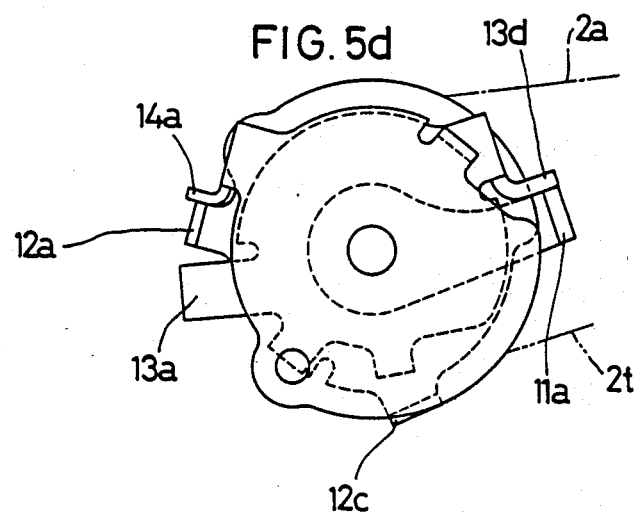

FIG. 5d shows the position of the rotary unit 4 when the accelerator pedal is further trodden to the throttle FULL-OPEN position. Although the motor ring 13 is still restrained from turning by the motor lever 11, the accelerator ring 12 is allowed to turn further by 20° from the position of FIG. 5c together with the throttle ring 14, thus bringing the throttle to 20°-OPEN position. This means that even if the throttle opening controller fails to function e.g. even if the motor lever 11 should get locked in the maximum angle position, the throttle can be opened at least 20° by treading the accelerator pedal by the maximum angle, provided the ring members remain rotatable. Thus, the vehicle will be allowed to start running. The parts will be at the following angles.

motor lever 11 . . . 92°
accelerator ring 12 . . . 84°
motor ring 13 . . . 0°
throttle ring 14 . . . 20°

Figure 5E:
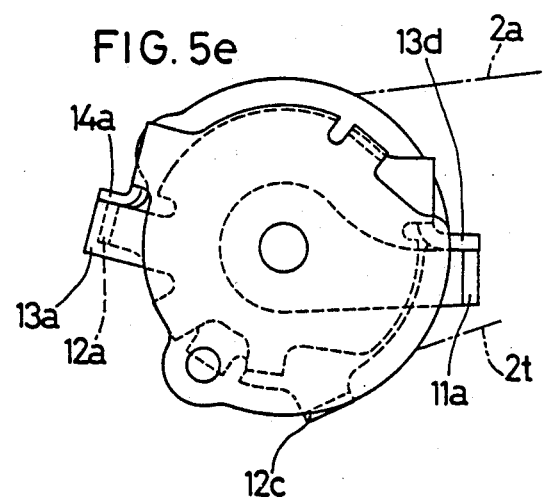

FIG. 5e shows the position of the rotary unit 4 when the motor lever 11 is in the 20°-OPEN position. If the accelerator pedal is trodden to the FULL-OPEN position, the accelerator ring 12 is rotated and the motor ring 13 and the throttle ring 14 will turn together with the ring 12 to the 20°-OPEN position, where the claw 13d of the motor ring 13 comes into abutment with the portion 11a of the motor lever 11, so that the motor ring 13 and the throttle ring 14 can not turn any further. The throttle is thus kept in the 20°-OPEN position.

The accelerator ring 12 is turned by another 64° until its claw 12a overlaps the claw 14a of the throttle ring 14 which is in engagement with the claw 13a of the motor ring 13. Thus, when the motor lever 11 is in the 20°-OPEN position, the throttle is opened to and kept in the 20°-OPEN position by treading the accelerator pedal. Even if the accelerator ring 12 is further turned, only the elastic member 16 stretches, keeping the other members from rotating. The parts will be at the following angles.

motor lever 11 . . . 72°
accelerator ring 12 . . . 84°
motor ring 13 . . . 20°
throttle ring 14 . . . 20°

If the angle of rotation of the motor lever 11 from its original position is less than 72° (more than 20° in terms of opening of the throttle), the throttle can be opened up to the angular position defined by that of the motor lever 11 by treading the accelerator pedal to such a position. The accelerator ring 12 will turn further, pulling the elastic member 16, but stop short of the claw 13a of the motor ring 13 and the claw 14a of the throttle ring 14.

FIGS. 6a to 6d, which correspond to FIGS. 5a to 5d, respectively, are prepared for better understanding of the operation of the rotary unit 4. In these figures, the rotational motions of the motor lever 11, accelerator ring 12, motor ring 13 and throttle ring 14 are converted into linear motions for convenience sake.

Figure 6A:
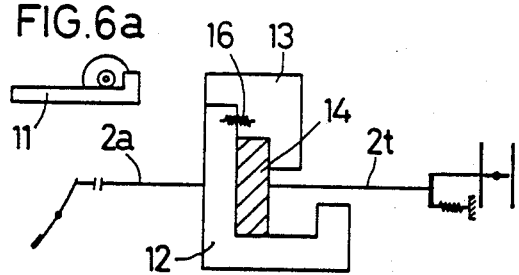
Figure 6B:
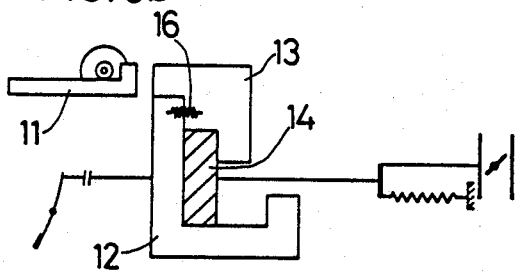

In FIG. 6a, the accelerator pedal is not trodden and the motor lever 11 is in its inoperative position. FIG. 6b shows the position of the rotary unit 4 when the accelerator pedal is trodden to its limit with the motor lever 11 in its inoperative position. The accelerator ring 12 connected to the accelerator pedal through the wire 2a is turned in unison with the motor ring 13 and the throttle ring 14 to the FULL-OPEN position to fully open the throttle. In this figure, their rotational motions from the FULL-CLOSE position to the FULL-OPEN position are represented by the linear motions from right to left.

Figure 6C:
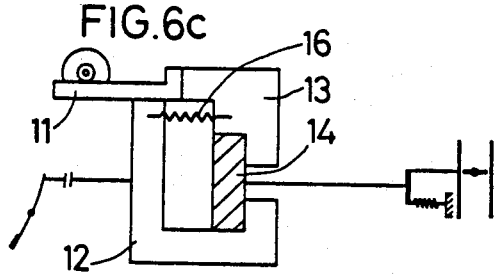
Figure 6D:
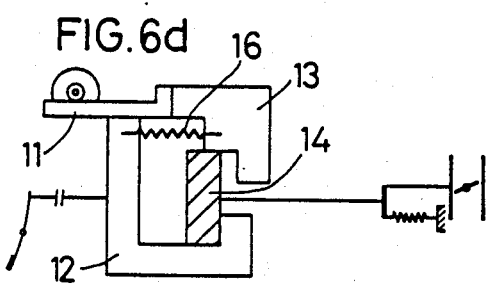

In FIG. 6c, the traction control is in action and the motor lever 11 is turned from its inoperative position to the FULL-CLOSE position, i.e. moved from left to right in this figure to butt the motor ring 13 and hold it as well as the throttle ring 14 in their initial position. Though the accelerator pedal is trodden to such a position as to turn the accelerator ring 12 from its initial position by 64° in the throttle-opening direction i.e. move from right to left in this figure by a distance corresponding to its actual rotary motion, the motor ring 13 and throttle ring 14 are still held in their initial position, keeping the throttle closed. In this state, the accelerator ring 12 is brought into engagement with the throttle ring 14. When the accelerator pedal is further trodden from this state, the accelerator ring 12 will be turned further in the throttle-opening direction i.e. to further left as shown in FIG. 6d. The throttle ring 14 is turned or moved in the same direction together with the accelerator ring 12 to open the throttle by 20°.

As is apparent from the drawings, the elastic member 16 has to have a higher rigidity than the throttle spring so that in normal conditions, only the throttle spring will expand.

Figure 7:
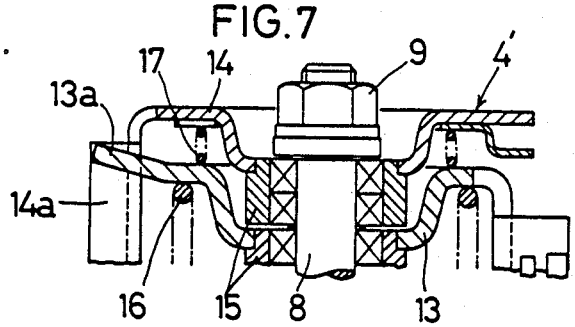
FIG. 7 is a sectional view of a portion of the second embodiment.
Figure 8:
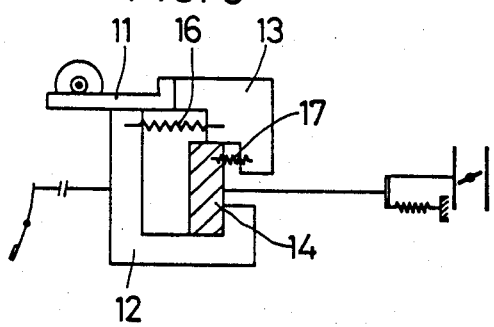
FIG. 8 is an explanatory view of the operation of the second embodiment.

FIG. 7 shows the second embodiment of the present invention which differs from the first embodiment only in that another elastic member 17 is provided between the throttle ring 14 and the motor ring 13 with one end on the throttle ring and the other end on the motor ring. FIG. 8 corresponds to FIG. 6 for the first embodiment.

In this embodiment, if the failsafe function is activated as shown in FIG. 8, the accelerator pedal will become difficult to tread because the resistance of the elastic member 17 directly acts on the pedal, thus giving a warning to the driver. The member 17 is adapted to be stretched when the accelerator ring is turned to its maximum angular position in the throttle-opening direction with the motor lever in a position between the throttle-closed position and a predetermined angular position.

What is claimed is:

1. A throttle opening controller for a motor vehicle, comprising:
   an output shaft;
   a driving means for driving said output shaft;
   a motor lever fixedly mounted on said output shaft; and
   a ring unit comprising an accelerator ring, a motor ring and a throttle ring all rotatably mounted on said output shaft;
   said motor lever and said three rings being adapted to turn independently of one another in two opposite directions, that is a throttle-opening direction and a throttle-closing direction, said accelerator ring being connected through a first wire to an accelerator pedal so as to be turned with the reciprocating movement of said accelerator pedal and having an engaging means adapted to engage and turn said throttle ring in said throttle-opening direction, said motor ring being coupled to said accelerator ring through an elastic means so as to be turned with said accelerator ring and having an engaging means adapted to engage and turn said throttle ring in said throttle-opening direction, said throttle ring being connected through a second wire to a throttle for a vehicle engine and biased by a spring means in said throttle-closing direction, the opening of said throttle being determined by the angular position of said throttle ring, said motor lever having engaging means adapted to engage said motor ring to prevent it from turning in said throttle-opening direction, said throttle ring being adapted to move in the throttle-opening direction together with said accelerator ring when said accelerator ring is turned in the throttle-opening direction, even if said motor ring is prevented by said motor lever from turning in the throttle-opening direction.

2. A throttle opening controller as claimed in claim 1, wherein said elastic means is a coil spring.

3. A throttle opening controller as claimed in claim 2, wherein said coil spring has a higher rigidity than a spring provided to bias said throttle to its closed position.

4. A throttle opening controller as claimed in any of the claims 1 to 3, further comprising a second elastic means provided between said throttle ring and said motor ring with one end on said throttle ring and the other end on said motor ring, said second elastic means being adapted to be stretched when said accelerator ring is turned to its maximum angular position in the throttle-opening direction with said motor lever in a position between the throttle-closed position and a predetermined angular position.

* * * * *